United States Patent
Pullen et al.

(10) Patent No.: US 8,031,734 B2
(45) Date of Patent: *Oct. 4, 2011

(54) SYSTEM, METHOD AND COMPUTER PROGRAM FOR IN-PLACE, LIGHTWEIGHT ACK PROMOTION IN NETWORK ENVIRONMENT

(75) Inventors: David Pullen, Suwanee, GA (US); Rick Pitchford, Suwanee, GA (US); Dannie Gay, Lawrenceville, GA (US); John Horton, Alpharetta, GA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/749,124

(22) Filed: Mar. 29, 2010

(65) Prior Publication Data

US 2010/0182911 A1 Jul. 22, 2010

Related U.S. Application Data

(63) Continuation of application No. 11/889,938, filed on Aug. 17, 2007, now Pat. No. 7,688,842, which is a continuation of application No. 10/804,133, filed on Mar. 19, 2004, now abandoned.

(60) Provisional application No. 60/464,956, filed on Apr. 24, 2003.

(51) Int. Cl.
*H04L 12/54* (2006.01)
(52) U.S. Cl. ........................................ 370/428; 370/321
(58) Field of Classification Search .................. 370/428, 370/231
See application file for complete search history.

(56) References Cited

U.S. PATENT DOCUMENTS

| | | | | |
|---|---|---|---|---|
| 6,434,620 B1 * | 8/2002 | Boucher et al. | ............... | 709/230 |
| 6,473,425 B1 * | 10/2002 | Bellaton et al. | ............... | 370/392 |
| 6,687,227 B1 | 2/2004 | Li et al. | | |
| 6,894,974 B1 | 5/2005 | Aweva et al. | | |
| 6,928,052 B2 | 8/2005 | Packer | | |
| 7,145,887 B1 * | 12/2006 | Akgun et al. | ................. | 370/321 |
| 7,688,842 B2 * | 3/2010 | Pullen et al. | .................. | 370/428 |
| 2003/0223422 A1 | 12/2003 | Igarashi et al. | | |
| 2003/0223424 A1 * | 12/2003 | Anderson et al. | ............. | 370/392 |

(Continued)

FOREIGN PATENT DOCUMENTS

EP 1 180 869 A2 2/2002

(Continued)

OTHER PUBLICATIONS

Pullen, David, "Method and System for Dynamically Adjusting Acknowledgement Filtering for High-Latency Environments" U.S. Appl. No. 12/035,089, filed Feb. 21, 2008.

(Continued)

*Primary Examiner* — Luat Phung
(74) *Attorney, Agent, or Firm* — Sterne Kessler Goldstein & Fox P.L.L.C.

(57) ABSTRACT

A method for in-place, lightweight Ack packet promotion is provided. The method includes receiving a new Ack packet via a network; searching through a transmit queue for an old Ack packet that corresponds to the new Ack packet; and replacing the data in a number field, a checksum field, a window size field, and a timestamp options field of the old Ack packet with data in a number field, a checksum field, a window size field, and a timestamp options field of the new Ack packet.

24 Claims, 4 Drawing Sheets

U.S. PATENT DOCUMENTS

2004/0085915 A1 5/2004 Gronau et al.
2004/0202166 A1 10/2004 Dillon
2004/0205770 A1 10/2004 Zhang et al.
2004/0213278 A1 10/2004 Pullen et al.

FOREIGN PATENT DOCUMENTS

| EP | 1 180 869 A3 | 2/2002 |
| WO | WO 00/79831 | 12/2000 |
| WO | WO 01/31833 | 5/2001 |

OTHER PUBLICATIONS

European Search Report for EP Application No. 04009900.4, completed on Jan. 14, 2008 and issued on Jan. 25, 2008.
Balakrishnan H. et al., "The Effects of Asymmetry on TCP Performance", Mobicom, Proceedings of the Annual International Conference on Mobile Computing and Networking, pp. 77-89, Sep. 1997, XP000853511.

* cited by examiner

SYSTEM, METHOD AND COMPUTER PROGRAM FOR IN-PLACE, LIGHTWEIGHT ACK PROMOTION IN NETWORK ENVIRONMENT

CROSS-REFERENCE TO RELATED APPLICATIONS

This application is a continuation of U.S. patent application Ser. No. 11/889,938, entitled "Method for In-Place, Lightweight Ack Packet Promotion in a Wireless Network," filed on Aug. 17, 2007, which in turn is a continuation of U.S. patent application Ser. No. 10/804,133, entitled "System and Method for In-Place, Lightweight Ack Packet Promotion," filed Mar. 19, 2004, which in turn claims the benefit of U.S. Provisional Application 60/464,956, entitled "System and Method for In-Place, Lightweight Ack Packet Promotion," filed Apr. 24, 2003, all of which are incorporated by reference herein in its entirety.

BACKGROUND OF THE INVENTION

1. Field of the Invention

The present invention is related to improving the performance of Transmission Control Protocol (TCP) based applications on Data Over Cable Service Interface Specification (DOCSIS) channels.

2. Related Art

The importance to the modern economy of rapid data access and exchange cannot be overstated. This explains the exponentially increasing popularity of the data access and exchange via cable networks (including coaxial cable or Hybrid fiber coaxial cable), the Internet, intranets, wireless networks, satellites and so forth (i.e., communication mediums). Rapid data access and exchange is partly dependent upon how efficiently bandwidth is allocated to a data provider in order for the data provider to transfer the requested data to a user via one of the communication mediums mentioned above.

One very desirable solution for rapid data access and exchange is via cable networks and cable modems. Cable modems provide communications on cable networks. In general, a user connects a cable modem to the TV outlet for his or her cable TV, and the cable TV operator connects a cable modem termination system (CMTS) in the operator headend. The CMTS is a central device for connecting the cable network to a data network like the Internet. The CMTS is a central distribution point for a cable system. Data flows downstream from the CMTS to the cable modem (i.e., downstream communication). Alternatively, data flows upstream from the cable modem to the CMTS (i.e., upstream communication).

A common cable modem standard today is the CableLabs® Certified™ Cable Modem project, also known as DOCSIS® (Data Over Cable Service Interface Specification), which defines interface requirements for cable modems involved in high-speed data distribution over cable television system networks. The DOCSIS specifications define technical requirements for both cable modems and CMTS.

The performance of Transmission Control Protocol (TCP) based applications (such as File Transfer Protocol (FTP) and HyperText Transfer Protocol (HTTP)) is severely limited on DOCSIS channels due to the extreme asymmetry between the speed of the upstream and downstream paths, as well as due to the high latency of the upstream path relative to the lower latency of the downstream path. These issues also apply to numerous other physical link types (satellite, DSL, etc). One of the approaches to alleviating the bottlenecks is called Ack Filtering, where the customer premises equipment ("CPE") device (such as, a cable modem or router) looks for TCP Ack packets being queued to be transmitted upstream, and removes "older" Ack packets in favor of sending the newer Ack packet. The older Ack packet is removed only if the packet contains no data. If there is data in the older Ack packet, then it cannot be removed without discarding the data. However, the newer Ack number can be promoted to the older packet. A TCP Ack is any TCP packet that has the Ack bit set in the flags portion of the TCP header, and the Acknowledgement Number value indicates the Sequence Number being acknowledged.

There are several issues related to Ack Filtering that can make the implementation difficult and inefficient, especially when taking into account DOCSIS features like piggyback requests and concatenation.

SUMMARY OF THE INVENTION

A method for in-place, lightweight Ack packet promotion in networks is provided. The method includes receiving a new Ack packet via a network; searching through a transmit queue for an old Ack packet that corresponds to the new Ack packet; and replacing the data in a number field, a checksum field, a window size field, and/or a timestamp options (TSO) field of the old Ack packet with data in a number field, a checksum field, a window size field, and/or a TSO field of the new Ack packet.

BRIEF DESCRIPTION OF THE FIGURES

The present invention will be described with reference to the accompanying drawings, wherein.

DETAILED DESCRIPTION OF THE PREFERRED EMBODIMENTS

A. Overview of the Invention

As mentioned above, there are several issues related to Ack Filtering that can make the implementation difficult and inefficient, especially when taking into account DOCSIS features like piggyback requests and concatenation. Ack Filtering involves removing "unnecessary" TCP Ack packets from the outbound or transmit queue(s). Because TCP Acks are cumulative, it is not necessary to transmit all of them. For example, if a client tries to send three Ack packets, and Ack 3 arrives before Ack 1 has been transmitted, it is possible to discard Acks 1 and 2 and only send Ack 3. This is because Ack 3 includes the acknowledgement for data that would have been provided by Ack 1 and Ack 2.

One issue with many hardware direct memory access ("DMA") engines is that once a packet is queued for transmission, the hardware will fetch the buffer (or buffer descriptors), making it impossible to remove that packet from the queue without significantly interrupting the transmission service. Additionally, it may not be possible to know whether or not the packet at the front of the queue is currently being transmitted. Here, removing the packet while it is being transmitted may cause a number of problems, including but not limited to, packet corruption, loss of hardware state synchronization, etc. One solution to this is to do Ack Filtering only on packets beyond the one at the head of the queue. However, this introduces latency to the system that should be avoided.

In order to provide optimal operation, and to ensure that the most recent Ack is transmitted as soon as possible, the present invention provides in-place, lightweight Ack promotion. Rather than removing the old Ack packet from the queue and putting the new packet in the queue, the present invention copies only the necessary fields from the new Ack to the buffer containing the old Ack. The present invention then discards the packet containing the new Ack. This essentially promotes the old Ack to contain the acknowledgement information from the new Ack, making the new Ack packet unnecessary. This will be described further below with reference to FIGS. 1-3.

For illustration purposes, the present invention is described in terms of being utilized with a cable network and DOCSIS. It should be understood that the present invention is independent of the actual physical layer of transmission utilized by DOCSIS (e.g., TDMA, SCDMA, etc.). It should also be understood that the present invention is not limited to use with a cable network and/or DOCSIS. In fact, the present invention may be used with any communication medium, including but not limited to, Ethernet-based networks (e.g., IEEE 802.3), fiber optic networks, wireless networks and satellite-based networks.

B. System Architecture Overview

Figure 1:
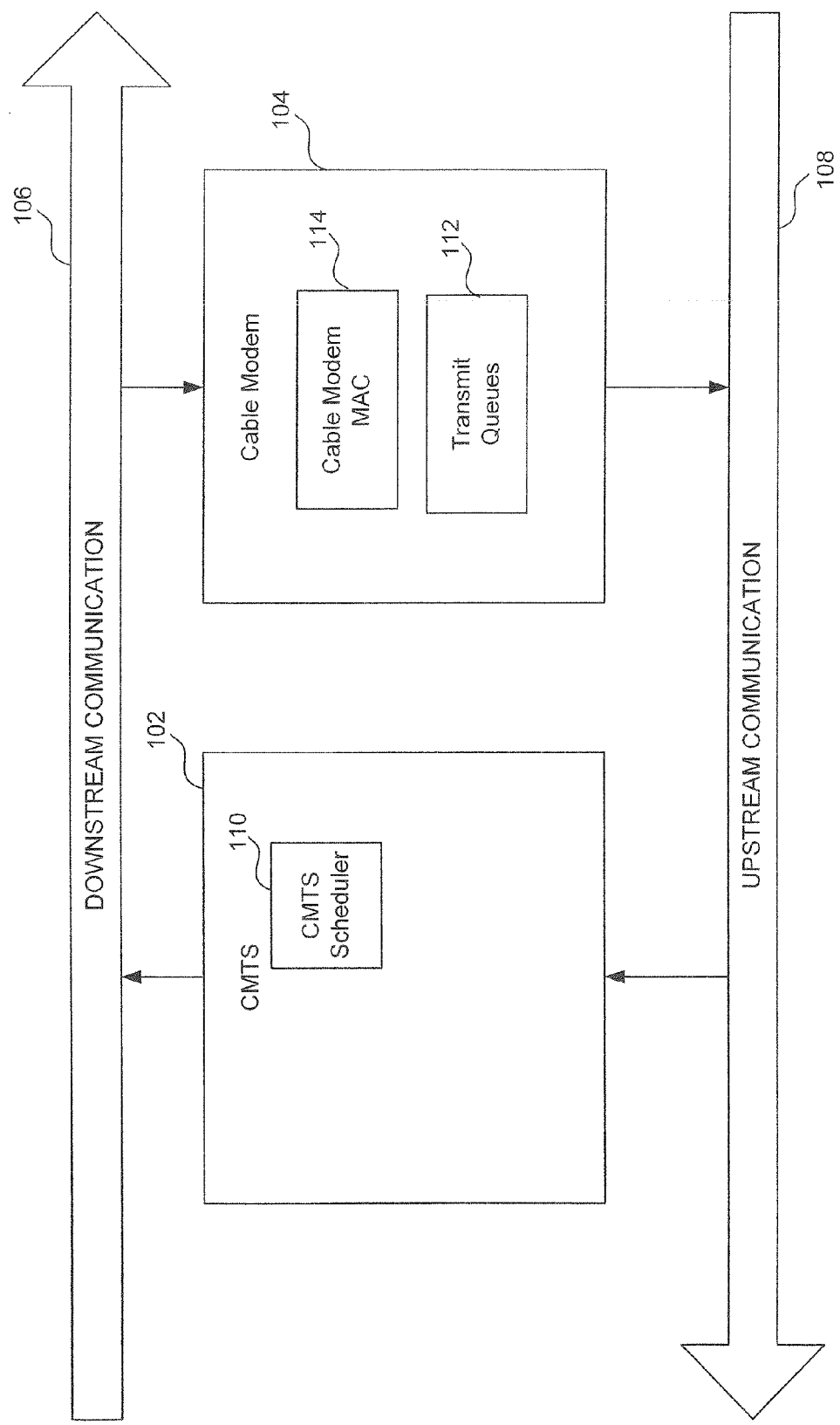
FIG. 1 is a block diagram representing an example operating environment of the present invention according to an embodiment.

FIG. 1 is a block diagram representing an example operating environment of the present invention. It should be understood that the example operating environment in FIG. 1 is shown for illustrative purposes only and does not limit the invention. Other implementations of the operating environment described herein will be apparent to persons skilled in the relevant art(s) based on the teachings contained herein, and the invention is directed to such other implementations. Referring to FIG. 1, a CMTS 102, a cable modem 104, downstream communication 106 and upstream communication 108, are shown. CMTS 102 further includes a CMTS scheduler 110. Cable modem 104 includes cable modem Media Access Controller (MAC) 114 and one or more transmit queues 112. It is noted that communication lines 106 and 108 may be the same line or separate lines. Each of the components in FIG. 1 will be briefly described next.

In general, cable modem 104 forwards or provides data via communications on cable networks. Cable modem 104 receives data from a user that needs to be transferred via a cable network. In order to do this, cable modem 104 requests that CMTS 102 grant to it the necessary bandwidth via a request packet. It is noted that only one cable modem 104 is shown. However, it is contemplated that there may be dozens, or hundreds, or thousands of cable modems in a system.

As mentioned, cable modem 104 receives data from a user to be transferred via a cable network. In addition, CMTS 102 receives data from the network to be transferred to cable modem 104.

Cable modem MAC 114 is coupled to cable modem 104. In general, cable modem MAC 114 is responsible for multiplexing the internal traffic, (i.e., requesting the necessary bandwidth that cable modem 104 needs to transfer its current types of data). Cable modem MAC 114 sends bandwidth requests to CMTS 102 via upstream communication 108. At a high level, each bandwidth request may include two fields. The two fields include a data service identifier (SID) and the amount of required bandwidth.

Transmit queue(s) 112 is used by cable modem 104 to queue packets to be transmitted via upstream communication 108. One type of packet stored in transmit queue(s) 112 is TCP Ack packets. TCP Ack packets are described further below with reference to FIG. 2 and FIG. 4.

CMTS 102 is a central device for connecting the cable network to a data network. CMTS scheduler 110 is a bandwidth manager. CMTS scheduler 110, as a bandwidth manager, decides how to grant available bandwidth according to the current bandwidth requests. This grant is done via a packet sent onto downstream communication 106 to cable modem 104. It is important to note that this request/grant negotiation between cable modem 104 and CMTS 102 is one of the reasons why the upstream latency is high.

Another reason for the high latency is the MAP lead time. CMTS 102 sends bandwidth grants downstream to cable modem 104 a certain amount of time before the bandwidth is to be used. This ensures that the grants will not arrive too late for cable modem 104 to make use of them. The amount of lead time is often configurable, and can range from less than one millisecond to more than ten milliseconds.

Another reason for latency is the downstream interleaver depth. The interleaver provides some protection against errors on the downstream 106. There exists a direct correlation between interleaver depth and the degree of protection and/or latency. If more depth is provided, greater protection and higher latency can be achieved. The parameter for interleaver depth is also configurable. Valid depths are specified in the DOCSIS RFI specifications. The present invention overcomes all of these forms of latency in a DOCSIS-compliant system.

Figure 2:
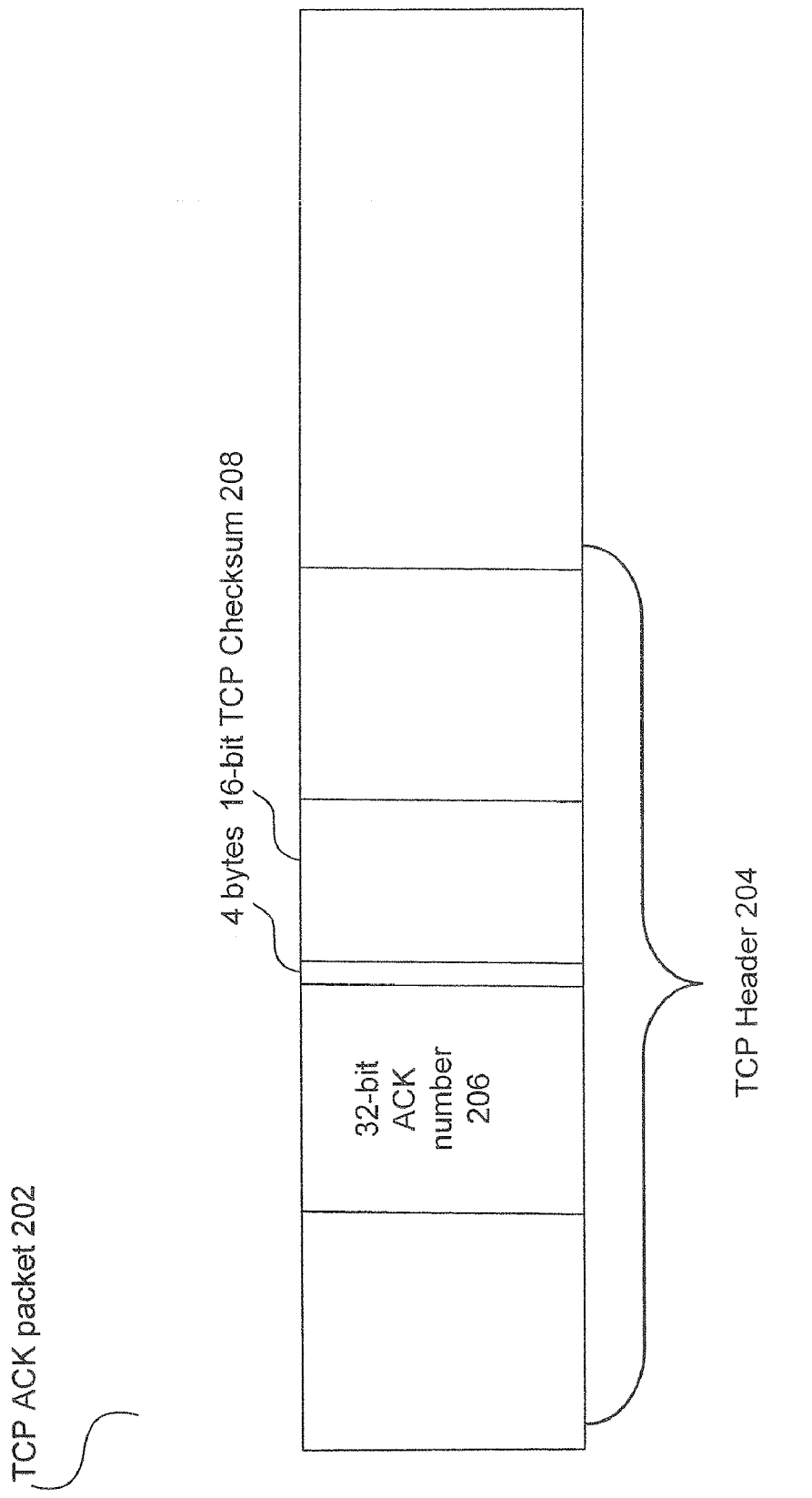
FIG. 2 represents a TCP Ack packet according to an embodiment of the present invention.

TCP Ack packets are described further with reference to FIG. 2. Note that a TCP Ack packet is any TCP packet with the Ack bit set. FIG. 2 illustrates an example TCP Ack packet 202. Among other fields, packet 202 includes a TCP header field 204. Header field 204 includes a 32-bit Ack number field 206 and a 16-bit TCP checksum field 208. ACK number field 206 is located 8 bytes from the start of header field 204. TCP checksum field 208 is located 16 bytes from the start of header field 204.

Figure 4:
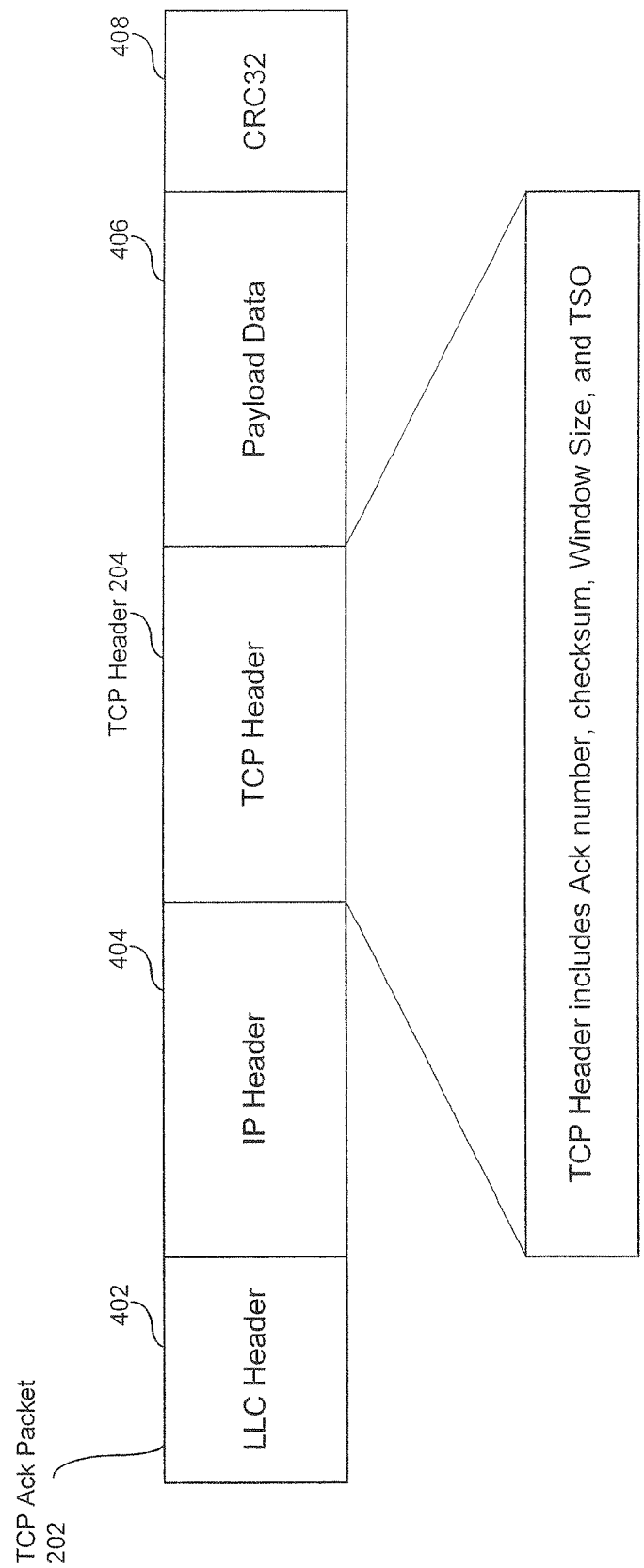
FIG. 4 represents a TCP Ack packet according to another embodiment of the present invention.

FIG. 4 illustrates another example of TCP Ack packet 202, which shows an entire packet. An LLC header 402, an IP header 404, payload 406, and CRC field 408 are included. TCP header field 204 includes information for handling the window size and timestamp options (TSO) in additions to fields for ACK number and checksum. Other fields can be included with packet 202 as described in the TCP DARPA Internet Program Protocol Specification (RFC 793), which is incorporated herein by reference.

As stated above, the present invention ensures that the most recent Ack packet is transmitted as soon as possible by implementing in-place, lightweight Ack promotion. Rather than removing the old Ack packet from transmit queue(s) 112 and putting the new packet in transmit queue(s) 112, the present invention copies only the necessary fields from the new Ack packet to the buffer containing the old Ack packet. The present invention then discards the Ack packet containing the new Ack. This essentially promotes the old Ack packet to contain the acknowledgment information from the new Ack packet, making the new Ack packet unnecessary. These necessary fields include Ack number field 206 and TCP checksum field 208, as shown in FIG. 2, as well as the window size field and TSO field, as shown in FIG. 4.

Note that using in-place, lightweight Ack promotion ensures that the most recent Ack packet will be transmitted. In addition, because the Ack number field 206 and checksum field 208 (as well as the window size field and TSO field, if included) are near the end of the packet 202, the present invention can even promote Ack packets while they are being transmitted.

This approach also has a benefit related to rate shaping. Cable modems are required to implement rate shaping to limit the amount of bandwidth that they use over a period of time. This delays packets that would exceed the rate limit. Because the in-place Ack promotion code causes the new Ack packet to be discarded, it does not count against rate limits, and thus allows more packets to be sent sooner.

C. Operation of the Present Invention

Figure 3:
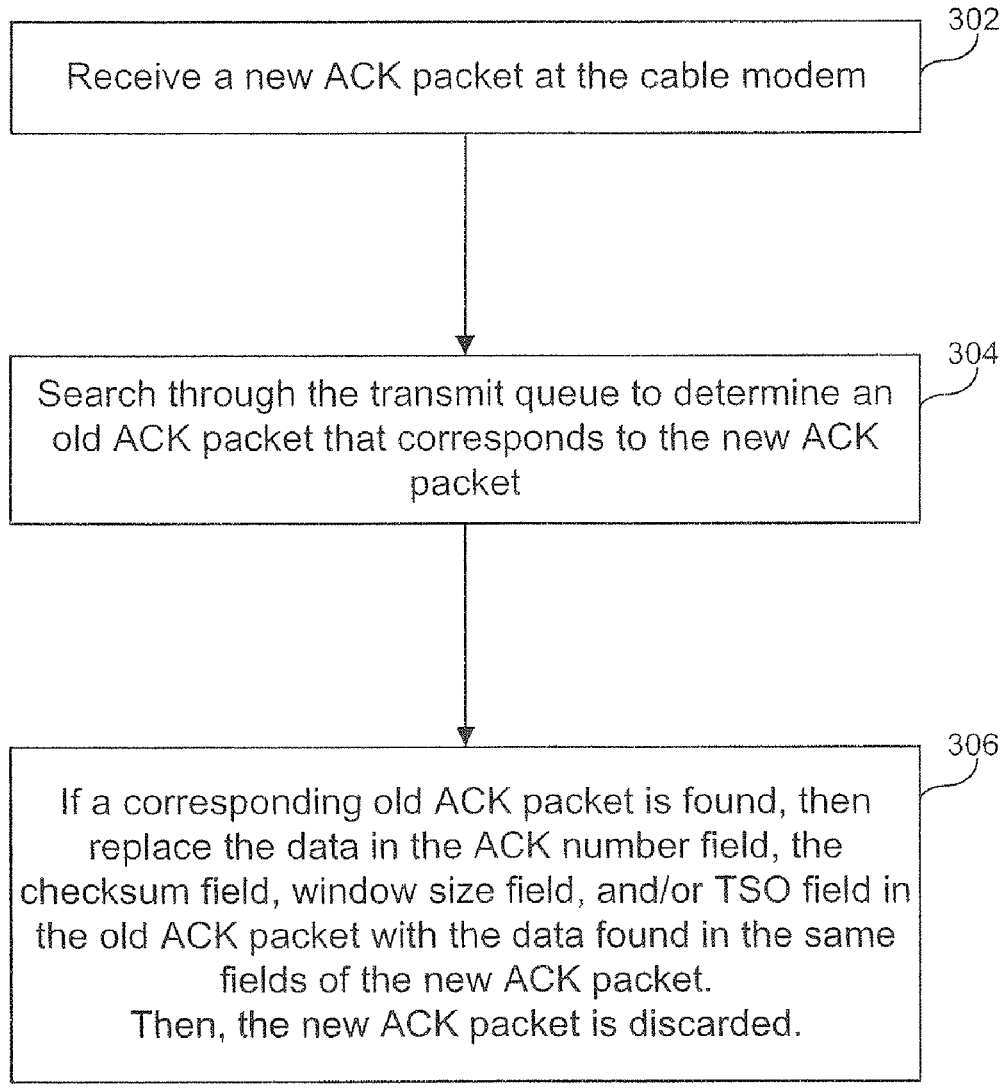
FIG. 3 illustrates the high level operation of the invention.

FIG. 3 is a flowchart that illustrates the operation of the present invention. FIG. 3 starts at step 302, where cable modem 104 receives a new Ack packet.

In step 304, cable modem 104 searches through transmit queue(s) 112 to determine whether queue(s) 112 contains an old Ack packet that corresponds to the new Ack packet. The present invention must ensure that it replaces data in an old Ack packet that corresponds to the same Ack stream as the new Ack packet.

Each client (e.g. a PC) can communicate with multiple TCP streams, and there may be multiple clients attached to cable modem 104. Each of the streams is identified by the tuple (source IP address, destination IP address, source port number, destination port number). If the present invention were to replace the Ack packet information for stream 1 with an Ack packet for stream 2, it would cause the remote host for stream 1 to receive incorrect Ack information, possibly causing the transfer to fail, or causing unexpected retransmission. Additionally, the remote host for stream 2 would not receive an Ack packet at all, which would cause a pause in the data flow or retransmission of data.

Even within a single Ack stream, a new Ack packet can only replace the information from a nearly identical old Ack packet. The Ack packets can be used to carry other information (TCP options, payload, etc), and the present invention cannot allow a new Ack packet to cause this additional information to be changed, corrupted, or lost. In the same vein, the present invention cannot allow extra information carried by the new Ack packet to be lost. As a result, when searching through the queue of packets in transmit queue(s) 112, cable modem 104 must only select an old Ack packet for replacement if it matches the new Ack packet in every way except for data in the acknowledgment number field (i.e., Ack number field 206), window size field, and TSO field. This presents a performance problem because of the amount of data that must be compared (28 bytes or more) in order to ensure that the old and new Ack packets belong to the same stream and that the old and new Ack packets are nearly identical. In many cases, the present invention is attempting to promote the new Ack information to the buffer that is at the head of transmit queue (s) 112. The present invention needs to be able to identify the similar Ack packets quickly so that the promotion can occur before the old Ack packet is transmitted.

The present invention hashes the information from the old and new Ack packets down to a reasonably unique and small piece of information (such as a 32-bit stream id number that can be compared in a single CPU cycle) that is used to quickly identify whether or not the old and new Ack packets belong to the same stream, and whether or not there is additional data present that would prevent the new Ack packet from being promoted. In particular, the present invention utilizes the TCP checksum field 208 (FIG. 2 or FIG. 4) to act as a hash algorithm. The TCP checksum field 208 includes not only the entire TCP header and payload data, but also a pseudo-header that contains the IP addresses, IP protocol type, and the length of the TCP data. Other information and requirements are described in the TCP DARPA Internet Program Protocol Specification (RFC 793). Thus the present invention only needs to remove the acknowledgment number, window size, and TSO from the checksum, and the remaining value will be identical for Ack packets that differ only by the ack number.

Note, however, that the 16-bit checksum is not a perfect hash algorithm; for any two arbitrary packets, there is a 1 in 65,535 chance that they will produce the same checksum value. In order to make the hash value more robust, the present invention combines the modified checksum with the 16-bit source port number from the TCP header, giving a 1 in 4.29 billion chance that the hash will be the same. The source port number is chosen uniquely for every socket within a client that is communicating with a server, and it is very unlikely that two different clients will choose the same source port number at the same time. But, even if they did, the two clients must have different IP addresses, which will make the checksum produce a different value.

When the new Ack packet is received from the client, cable modem 104 calculates this 32-bit stream id, and stores it along with the Ack packet as it is queued to be transmitted. Thus, the present invention only calculates the stream id once per Ack packet. When a new Ack packet arrives, the present invention calculates the stream id and uses it to search the list of queued packets in transmit queue(s) 112, comparing the stream ids. If a match is found, the present invention promotes the Ack packet.

Thus, in step 306, if a corresponding old Ack packet is found, then cable modem 104 replaces the data in the Ack number field, the checksum field, window size field, and TSO field in the buffer containing the old Ack packet with the data found in the same fields of the new Ack packet. The new Ack packet is then discarded.

D. Robust Ack Transmission

Because the present invention often attempts to do in-place Ack promotion on the Ack packet that is at the front of transmit queue(s) 112, there is a risk that the Ack packet might be transmitted before it is modified. If the hardware is reading the portion of the Ack packet that is before the Ack number field, the present invention's promotion will work and the new Ack packet will be sent.

If the hardware is reading the portion of the Ack packet that is after the TCP checksum field 208, the present invention's in-place modification will be ignored and an older Ack packet will be sent.

If the hardware is reading the portion of the Ack packet between the Ack number field 206 and the checksum field 208, the Ack packet can be corrupted (the checksum will not match the information that is in the header, and the remote system will discard it). However, in an embodiment of the present invention, a Data Cache is utilized to minimize the risk of this type of corruption. The Data Cache is built into the processor to store the updated information. After the new Ack information has been completely copied to the Data Cache, it is then flushed to physical memory (e.g., RAM) so that a DMA controller can read it when the packet is transmitted. The data that is updated spans two cache lines, which can take two bus cycles to flush. By comparison, directly modifying the buffer in RAM can take a dozen or more bus cycles.

Although utilizing a Data Cache significantly reduces the odds that a corruption may occur, corruption can still occur.

In order to overcome these problems, the present invention checks the status of the Ack packet after the present invention completes the modifications. If the Ack packet is still owned by hardware, it has not been transmitted, and the modifications were successful. If the Ack packet is owned by software, it has been transmitted, and the present invention assumes that the packet was corrupted or the modifications were ignored. In this case, the present invention simply allows the new Ack packet to be queued so that it will be transmitted at the next opportunity.

This is similar to what would happen if there was a gap in the Ack stream (which happens frequently). Here, the present invention would search the list of queued packets in transmit queue(s) 112 and find that there are no matching Ack streams to replace, so the new Ack packet must be queued.

E. Piggyback Request Support

A DOCSIS-compliant system uses a controlled-access medium for upstream transmission. A cable modem sends a request to the CMTS telling it that it has data to send, and how much time (minislots) it needs to send the data. At some point in the future, the CMTS grants time to the cable modem so that it can transmit the packet.

The request can be sent in a contention region, which is used by all cable modems, or can be sent as a piggyback request, essentially embedding the request in a packet that is currently being transmitted. As the number of cable modems on the cable plant increases, the odds that multiple cable modems will transmit in the same contention region increases, which causes the request to be lost and starts a request backoff mechanism that delays transmission of the packet.

In order to avoid collisions, it is always best to try to use the piggyback request mechanism. Additionally, using piggyback requests will often let the CMTS receive the request sooner and can let the cable modem transmit sooner, thus reducing latency.

However, if there is a single Ack stream (such as an FTP get from just one client), the Ack Filtering feature of the present invention will ensure that only one packet is ever queued. To make use of a piggyback request, a second packet must be queued.

Generally, hardware will not allow arbitrary/predictive requests to be made in software. Also, the present invention cannot just queue a dummy Ack packet, since that Ack packet might be transmitted (if a new Ack packet does not arrive soon enough).

In order to overcome this and make use of piggyback requests, the present invention actually allows the new Ack packet to be queued after performing in-place promotion. When a new Ack packet arrives, the invention searches the queue and does promotion as described above. Then, if the Ack packet that was promoted into (the old Ack packet) is at the front of the queue, and if there are no other packets queued after it, the invention allows the new Ack packet to be queued. When the packet at the front of the queue is finally transmitted, the hardware will make a piggyback request for the Ack packet that is queued behind it. If no other Ack packets arrive, then this Ack packet is transmitted. Since it contains the same information as the Ack that was previously transmitted, there is no harm. If new Ack packets arrive, they will be promoted into the Ack packet that is now at the front of the transmit queue (noting that the new Ack packet will be queued as the new second Ack packet for piggyback purposes).

After two packets are queued, as new Ack packets arrive and are promoted into the first Ack packet, the invention must also promote them into the second Ack packet. This ensures that both packets contain identical information up to the point where the first packet is transmitted.

This causes fewer Ack packets to be dropped, since the present invention will always try to keep two packets in the queue, but the reduced latency, improved request efficiency, and reduced chance of collisions makes this worthwhile.

This applies to cases where there is a single Ack stream. If multiple Ack streams exist (such as with typical web surfing or multiple FTPs), there will rarely be just one Ack packet in the queue, and the multiple Ack packets will allow piggybacking off of each other.

F. Conclusion

FIGS. 1-4 are conceptual illustrations allowing an explanation of the present invention. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention is implemented using software, the software can be stored in a computer program product and loaded into computer system using a removable storage drive, hard drive, or communications interface. The control logic (software), when executed by a processor, causes the processor to perform the functions of the invention as described herein.

In another embodiment, aspects of the present invention are implemented primarily in hardware using, for example, hardware components such as an application specific integrated circuits (ASIC), a field programmable gate array (FPGA), or a similar device providing hardware assists to enable a software application to support the functions described herein. Implementation of the hardware state machine so as to perform the functions described herein will be apparent to one skilled in the relevant art(s).

In yet another embodiment, the invention is implemented using a combination of both hardware and software.

While various embodiments of the present invention have been described above, it should be understood that they have been presented by way of example, and not limitation. It will be apparent to one skilled in the relevant art(s) that various changes in form and detail can be made therein without departing from the spirit and scope of the invention. Moreover, it should be understood that the method, system, and computer program product of the present invention could be implemented in any multi-nodal communications environment governed by centralized nodes. The nodes include, but are not limited to, cable modems, set-top boxes, and headends, as well as communication gateways, switches, routers, Internet access facilities, servers, personal computers, enhanced telephones, personal digital assistants (PDA), televisions, or the like. Thus, the present invention should not be limited by any of the above-described exemplary embodiments, but should be defined only in accordance with the following claims and their equivalents.

What is claimed is:

1. A method for Ack packet promotion, comprising:
   receiving at a processing device a new Ack packet;
   generating a stream identifier associated with the new Ack packet, wherein the stream identifier is a function of a modified version of the TCP checksum field and a source port number from a TCP header;
   searching through a transmit queue for an old Ack packet having a stream identifier that corresponds to the stream identifier of the new Ack packet, and
   replacing the data in only one or more of a number field, a checksum field, a window size field, and a timestamp options field of the old Ack packet with corresponding data in a number field, a checksum field, a window size field, and a timestamp options field of the new Ack packet in response to said searching identifying an old Ack packet having a stream identifier that corresponds to the stream identifier of the new Ack packet.

2. The method of claim 1, further comprising discarding the new Ack packet in response to said searching identifying an old Ack packet having a stream identifier that corresponds to the stream identifier of the new Ack packet.

3. The method of claim 1, further comprising queuing the new Ack packet for a piggyback request in response to said searching identifying an old Ack packet having a stream identifier that corresponds to the stream identifier of the new Ack packet.

4. The method of claim 1, further comprising adding the new Ack packet and the associated stream identifier to the transmit queue in response to said searching not identifying an old Ack packet having a stream identifier that corresponds to the stream identifier of the new Ack packet.

5. The method of claim 1, wherein the checksum field is modified to remove an acknowledgement number in the number field, the window size field and the timestamp options field from the checksum field.

6. The method of claim 5, wherein generating the stream identifier associated with the new Ack packet comprises applying a hash function to the modified version of the checksum field and the source port number from the header.

7. A non-transitory computer-readable medium having instructions stored thereon, execution of which, by a computing device causes the computing device to perform operations comprising:
   receiving at a processing device an Ack packet;
   searching through a transmit queue for an old Ack packet that corresponds to said the new Ack packet;
   generating a stream identifier associated with the new Ack packet, wherein the stream identifier is a function of a modified version of a TCP checksum field and a source port number from a TCP header,
   replacing the data in a numbers field, a checksum field, a window size field, and/or a timestamp options field of said old Ack packet with data in a number field, a checksum field, a window size field, and/or a timestamp options field of the new Ack packet; and
   queuing the new Ack packet in response to detecting that the old Ack packet has been transmitted before said replacing operation is completed.

8. The non-transitory computer-readable medium according to claim 7, the operations further comprising:
   discarding the new Ack packet.

9. The non-transitory computer-readable medium according to claim 7, the operations further comprising:
   determining whether a stream associated with the old Ack packet and a stream associated with the new Ack packet are from a same stream.

10. The non-transitory computer-readable medium according to claim 9, wherein a tuple is utilized to identify the old Ack packet stream and the new Ack packet stream.

11. The non-transitory computer-readable medium according to claim 10, wherein the tuple includes a source IP address, a destination IP address, a source port number, and a destination port number.

12. The non-transitory computer-readable medium according to claim 9, wherein the checksum fields of the Ack packet and the new Ack packet are used as a hash algorithm.

13. A method for Ack packet promotion, comprising:
   receiving at a processing device a new Ack packet;
   generating a stream identifier associated with the new Ack Packet;
   determining whether a stream identifier associated with an old Ack packet that is currently being transmitted corresponds to the stream identifier of the new Ack packet; and
   when a determination is made that a stream identifier associated with an old Ack packet that is currently being transmitted corresponds to the stream identifier of the new Ack packet,
   when data that is before an Ack number field of the old Ack packet has been transmitted, replacing the data in only one or more of a number field, a checksum field, a window size field, and a timestamp options field of the old Ack packet with corresponding data in a number field, a checksum field, a window size field, and a timestamp options field of the new Ack packet, and discarding the new Ack packet, when data that is after a checksum field of the old Ack Packet has been transmitted, adding the new Ack packet and the associated stream identifier to the transmit queue, or
   when data that is between the Ack number field and the checksum field is being transmitted, replacing the data in only one or more of the number field, the checksum field, the window size field, and the timestamp options field of the old Ack packet with corresponding data in the number field, the checksum field, the window size field, and the timestamp options field of the new Ack packet, and applying a corruption test on the old Ack packet to determine whether to discard the new Ack packet or add the new Ack packet to the transmit queue;
   wherein the stream identifier is a function of a modified version of the checksum field and a source port number from a header.

14. The method of claim 13, wherein the checksum field is modified to remove an acknowledgement number in the number field, the window size field and the timestamp options field from the checksum field.

15. The method of claim 14, wherein generating the stream identifier associated with the new Ack packet comprises applying a hash function to the modified version of the checksum field and the source port number from the header.

16. A method for Ack packet promotion, comprising:
   receiving at a processing device a new Ack packet;
   generating a stream identifier associated with the new Ack packet, wherein the stream identifier is a function of a modified version of the TCP checksum field and a source port number from a TCP header;

searching through a transmit queue for an old Ack packet having a stream identifier that corresponds to the stream identifier of the new Ack packet;

when said searching identifies an old Ack packet having a stream identifier that corresponds to the stream identifier of the new Ack packet, replacing the data in only one or more of a number field, a checksum field, a window size field, and a timestamp options field of the old Ack packet with corresponding data in a number field, a checksum field, a window size field, and a timestamp options field of the new Ack packet; and when said searching does not identify an old Ack packet having a stream identifier that corresponds to the stream identifier of the new Ack packet, adding the new Ack packet and the associated stream identifier to the transmit queue.

17. The method of claim 16, wherein, when said searching identifies an old Ack packet having a stream identifier that corresponds to the stream identifier of the new Ack packet, further discarding the new Ack packet.

18. The method of claim 16, wherein, when said searching identifies an old Ack packet having a stream identifier that corresponds to the stream identifier of the new Ack packet, further queuing the new Ack packet for a piggyback request.

19. The method of claim 16, wherein the TCP checksum field is modified to remove an acknowledgement number in the number field, the window size field and the timestamp options field from the checksum field.

20. A method for Ack packet promotion, comprising:
receiving at a processing device a new Ack packet;
generating a stream identifier associated with the new Ack packet;
searching through a transmit queue for an old Ack packet having a stream identifier that corresponds to the stream identifier of the new Ack packet;
replacing the data in only one or more of a number field, a checksum field, a window size field, and a timestamp options field of the old Ack packet with corresponding data in a number field, a checksum field, a window size field, and a timestamp options field of the new Ack packet in response to said searching identifying an old Ack packet having a stream identifier that corresponds to the stream identifier of the new Ack packet; and
modifying the checksum field by removing an acknowledgment number in the number field, the window size field and the timestamp options field from the checksum field.

21. The method of claim 20, further comprising discarding the new Ack packet in response to said searching identifying an old Ack packet having a stream identifier that corresponds to the stream identifier of the new Ack packet.

22. The method of claim 20, further comprising queuing the new Ack packet for a piggyback request in response to said searching identifying an old Ack packet having a stream identifier that corresponds to the stream identifier of the new Ack packet.

23. The method of claim 20, further comprising adding the new Ack packet and the associated stream identifier to the transmit queue in response to said searching not identifying an old Ack packet having a stream identifier that corresponds to the stream identifier of the new Ack packet.

24. The method of claim 20, wherein generating the stream identifier associated with the new Ack packet comprises applying a hash function to the modified version of the checksum field and the source port number from the header.

* * * * *

UNITED STATES PATENT AND TRADEMARK OFFICE
CERTIFICATE OF CORRECTION

| | | |
|---|---|---|
| PATENT NO. | : 8,031,734 B2 | Page 1 of 1 |
| APPLICATION NO. | : 12/749124 | |
| DATED | : October 4, 2011 | |
| INVENTOR(S) | : Pullen et al. | |

It is certified that error appears in the above-identified patent and that said Letters Patent is hereby corrected as shown below:

Title Page, Item (54), "Program for In-Place" should be replaced with
--Program Product for In-Place--.

Column 9, line 52, "to said the new Ack packet" should be replaced with --to the new Ack packet--.

Column 9, line 57, "numbers field" should be replaced with --number field--.

Column 10, line 20, "Packet" should be replaced with --packet--.

Column 10, line 38, "Packet" should be replaced with --packet--.

Signed and Sealed this
Sixth Day of December, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,031,734 B2 | Page 1 of 1 |
| APPLICATION NO. | : 12/749124 | |
| DATED | : October 4, 2011 | |
| INVENTOR(S) | : Pullen et al. | |

It is certified that error appears in the above-identified patent and that said Letters Patent is hereby corrected as shown below:

Title Page, Item (54) and at Column 1, line 2, in the title, "Program for In-Place" should be replaced with --Program Product for In-Place--.

Column 9, line 52, "to said the new Ack packet" should be replaced with --to the new Ack packet--.

Column 9, line 57, "numbers field" should be replaced with --number field--.

Column 10, line 20, "Packet" should be replaced with --packet--.

Column 10, line 38, "Packet" should be replaced with --packet--.

This certificate supersedes the Certificate of Correction issued December 6, 2011.

Signed and Sealed this
Third Day of January, 2012

David J. Kappos
*Director of the United States Patent and Trademark Office*